United States Patent [19]

Feldman

[11] 3,855,065

[45] Dec. 17, 1974

[54] PRODUCTION OF STREPTOKINASE
[75] Inventor: Louis I. Feldman, Schiller Park, Ill.
[73] Assignee: Baxter Laboratories, Inc., Morton Grove, Ill.
[22] Filed: Oct. 30, 1972
[21] Appl. No.: 302,315

[52] U.S. Cl. .................................. 195/65, 195/66 B
[51] Int. Cl............................................. C12d 13/10
[58] Field of Search ........... 195/65, 66 R, 114, 66 B

[56] References Cited
UNITED STATES PATENTS
2,702,781    2/1955    Hawkins ............................... 195/65
3,654,089    4/1972    Coker et al. ........................... 195/65

Primary Examiner—Lionel M. Shapiro
Attorney, Agent, or Firm—Scott J. Meyer; Louis Altman

[57] ABSTRACT

An improved method for the fermentative production of streptokinase by the growth of hemolytic streptococci which consists of growing the bacteria in a fermentation medium containing corn steep liquor.

6 Claims, No Drawings

PRODUCTION OF STREPTOKINASE

This invention relates to a method for the production of streptokinase. More particularly, the present invention is concerned with an improvement in the fermentative production of streptokinase by hemolytic streptococci.

It has been known for some time that culture or culture filtrates of certain strains of beta hemolytic streptococci are able to cause rapid lysis of the fibrin clot. The active agent is a streptococcal fibrinolysin, so-called streptokinase, and the reaction has been termed fibrinolysis. The enzyme streptokinase has been most frequently associated with hemolytic streptococci of the Lancefield groups A, human C, and G, with the C group being preferred. In particular, the strain H46A (identified by the American Type Culture Collection, Rockville, Md. as No. 12449, Rebecca C. Lancefield, strain H46A, 1956) is the most generally employed strain.

In the selection of a medium for growth of streptokinase, various materials have been suggested heretofore. For economic reasons, the medium should be capable of producing massive growth of the streptococci. The various factors necessary for such massive growth have been elucidated by Bernheimer, et al., *J. Bact.* 43, pp. 481–94 (1942). In general, the medium has comprised a nitrogen source such as gelatin hydrolysate or casein digest supplemented with various amino acids such as cystine, glycine, tryptophane, tyrosine, methionine and glutamine; uracil and adenine; various salts; glucose; and certain members of the Vitamin B group.

U.S. Pat. No. 2,701,227 describes two of the primary nitrogenous materials employed heretofore in the fermentative production of streptokinase by hemolytic streptococci. They are an enzyme hydrolyzed casein digest available commercially from Sheffield Farms Co., Inc., New York, N.Y., and sold under the trademark "N-Z-Amine," and an animal protein digest available commercially from Difco Laboratories, Detroit, Mich., and marketed under the trademark "Neopeptone." Although both of the foregoing nitrogenous substances are capable of producing massive growth of the hemolytic streptococci, the yield of streptokinase when employing the animal protein digest as a nitrogen source is exceedingly low and the lot-to-lot variation of the casein hydrolysate causes extreme variations in the yield of streptokinase.

Accordingly, it is an object of the present invention to provide an improved culture medium for the fermentative production of streptokinase by hemolytic streptococci.

It is another object of this invention to provide an improved source of nitrogenous nutrients for the fermentation medium used in the production of streptokinase.

Other objects and advantages of the invention will be apparent to those skilled in the art after reading the disclosure hereof.

In accordance with the invention, the foregoing objects are achieved by employing corn steep liquor as the nitrogen source together with a metabolizable carbon source for the fermentative production of streptokinase by hemolytic streptococci. It has been found that when corn steep liquor is employed as the nitrogen source, a substantially more uniform and higher yield of streptokinase is obtained during fermentation than heretofore.

Moreover, the total number of ingredients exogenously added to the fermentation medium can be reduced from about 16 to 2, thereby resulting in a substantial reduction in cost of production.

Corn steep liquor is a well known by-product of the manufacture of corn starch. When corn starch is produced by the wet-milling process, the corn kernels are first soaked in a dilute solution of sulfurous acid at a pH of about 3 to 4, and a warm temperature of about 110° to 130° F for an extended period of time of about 2 to 4 days. In this soaking or steeping operation, the kernels are softened and swelled so that the subsequent milling operation results in a good separation of the starch from the germ, hull and gluten portions of the kernel. During this steeping process, soluble matter from the kernels passes into the steepwater. This liquor contains a complex of materials, including a variety of protein hydrolytic products, "B" complex vitamins, amines, and other organic and inorganic materials and entrained solids. The density of corn steep liquor ranges from about 3° to 7° Baume.

Although corn steep liquor has been described as useful in the fermentative production of certain antibiotics and enzymes, it has not been known heretofore to be suitable for use in the production of streptokinase. Since the previously required components for fermentative production of streptokinase have been defined as critical, it was surprising and unexpected to find that significant and substantial improvements in yield could be obtained even though accompanied by a reduction in 14 of the conventional 16 components when corn steep liquor is used in the medium as the nitrogen source.

In use of the corn steep liquor, it is preferred to remove entrained solids or insoluble matter therefrom prior to addition of the liquor to the fermentation medium. It has been observed that occasional lots of corn steep liquor, while supporting growth of the microorganism, do not allow significant synthesis of streptokinase. It has been found that clarification of the corn steep liquor converts these poor lots to lots that allow a high degree of synthesis of streptokinase and that adding back the removed solids to the clarified liquor again inhibits the streptokinase synthesis. Thus, it is believed that the entrained solids or insoluble matter in certain lots of corn steep liquor contain streptokinase synthesis inhibitors which can be removed by clarification.

The other steps in the fermentative production of streptokinase can be carried out in the conventional manner. Thus, a suitably prepared seed or mash inoculum of the hemolytic streptococci is propagated in the aqueous nutrient medium containing corn steep liquor and a metabolizable carbon source as defined herein and allowed to grow for about 8 to about 20 hours at a temperature of from about 30° to about 40° C. These two substances, corn steep liquor and a metabolizable carbon source, thus can be used in place of the conventional 16 or more components such as described in U.S. Pat. Nos. 2,701,227 and 2,702,781 and by Bernheimer et al., *J. Bact.* 43, pp. 481–94, 495–98 (1942).

As the metabolizable carbon source, a substance such as glucose, degraded corn starch and sucrose can be employed, but glucose is preferred.

The glucose employed in the fermentation media can be reagent grade material, but a technical grade known as "Cerelose" also is eminently suitable.

The preparation of the seed or mash inoculum also can be carried out in the conventional manner such as described, for example, in said U.S. Pat. Nos. 2,701,227 and 2,702,781. The amount of inoculum mash can vary although a 10% inoculum mash is preferred.

Since carbon dioxide is essential for the growth of hemolytic streptococci, the fermentation conditions are preferably controlled to facilitate the production of carbon dioxide. Carbon dioxide is liberated by the lactic acid which is produced almost quantitatively from glucose during the fermentation.

The fermentation is further facilitated by the use of bicarbonate and phosphate buffing salts at a pH of about 6 to about 8.5, but preferably about 7. $KHCO_3$ is the preferred bicarbonate salt although $NaHCO_3$ can also be used. The phosphate salt preferably is an acid phosphate, for example, $KH_2PO_4$.

The amount of corn steep liquor, glucose, $KHCO_3$ and $KH_2PO_4$ used in the fermentation medium can range from about 3% to about 12% corn steep liquor, from about 3% to about 12% glucose and, when used, from about 0.02% to about 2.0% $KHCO_3$ and from about 0.1% to about 2.0% $KH_2PO_4$, respectively. A preferred formulation contains about 8% corn steep liquor, 7% "Cerelose," 0.33% $KH_2PO_4$ and 0.2% $KHCO_3$.

It will be appreciated that production of pyrogenic streptokinase occasionally is obtained during the fermentation. In such cases, the streptokinase can be purified by chromatographic purification, gel filtration and the like procedures. A preferred method of purification is described in U.S. Pat. No. 3,255,094 and comprises passing a solution of the streptokinase through a column of gel consisting of cross-linked dextran derivatives which are commercially available under the trademark "Sephadex" G-75 and G-100 from Pharmacia Ltd. of Sweden, discarding the first fractions of eluate which contain the pyrogenic contaminants and collecting the later fractions of eluate which contain the purified streptokinase. In general, the incidence of pyrogenic material will be less with two components than with 16 components exogenously added to the fermentation medium.

The following examples will further illustrate the invention although the invention is not limited to these specific examples. All percentages herein are by weight unless otherwise specified.

EXAMPLE 1

A pilot plant fermentation system is steam sterilized for one hour and then held under a sterile air pressure. An inoculum mash (120 pounds) of growing hemolytic streptococci (strain H46A) is added to a 250 gallon stainless steel fermentor containing a solution of corn steep liquor (88 pounds), Cerelose (77 pounds), $KH_2PO_4$ (3 pounds and 10 ounces), and $KHCO_3$ (2 pounds and 3 ounces) in 919 pounds of water to form a total production size fermentation mash of 1,220 pounds. The following production conditions are then maintained.

1. Temperature: Controlled at 34° C.
2. Agitation: One impeller located at lowest receptacle. Top impeller placed out of mash level. Shaft run at 160 rpm.
3. Aeration: Tank held under 2 pounds top air.
4. pH: Controlled at 7.0±0.1 by automatic addition of 5N NaOH (ca. 150 pounds required).
5. Time: Fermentation is run until no further increase in streptokinase is evident (about 11 to 14 hours).

On the average, about 1,500–2,100 streptokinase units per milliliter of culture media were produced in about 12 hours of fermentation under the foregoing conditions during five production runs.

Following fermentation, the liquor is cooled and then clarified by filtration after pH adjustment to about 8.3 and addition of $Ca_3(PO_4)_2$ and filter aid. The streptokinase is precipitated by $(NH_4)_2SO_4$, recovered by filtration and use of filter aid and redissolved in about 10% of the original volume of water. Some inactive components are removed by addition of a low concentration of $(NH_4)_2SO_4$ and a polishing filtration. All of the remaining bacterial cells are then removed by filtration through a 0.22 m$\mu$ "Millipore" filter. Streptokinase is precipitated by about half saturation with $(NH_4)_2SO_4$ and recovered by filtration. The cake is extracted with acid and the enzyme is dissolved in dilute alkali. After acetone precipitation, the enzyme is dissolved in water and lyophilized. The dry material is redissolved in a minimum amount of phosphate buffer and fractionated on Sephadex G-100. The portion of eluate containing streptokinase is collected and then lyophilized and retained as the final product.

The final product has the following composition:

| | |
|---|---|
| Streptokinase (SK) units * per gram | $6.0 \pm 0.3 \times 10^7$ |
| Total nitrogen (micro Kjeldahl) | 12.5 ± 0.5% |
| Streptokinase units per mg N | 490 ± 30 |
| Hyaluronidase units per $10^5$ SK units | 15 ± 5 |
| Streptodornase units per $10^5$ SK units | 1.5 ± 0.5 |
| Sodium phosphate | 15.5 ± 0.5% |

*One enzyme unit is that amount of streptokinase which produces lysis, in ten minutes, of a clot formed under the conditions specified in Christensen, J. Clin. Invest. 28, pp. 163–72 (1949).

The final product is sterile and the enzyme is non pyrogenic in rabbits in a dose of 100,000 units per kilogram intravenously.

Electrophoresis on acrylamide gel of 2,750 enzyme units of the final product (approximately 30 $\mu$g of protein) shows the major streptokinase band, one minor band, and one trace band.

Infrared spectra of the streptokinase in KBr discs exhibits absorption bands at the following wavelengths (in microns): 3.03, 3.24, 3.37, 3.42, 6.05, 6.50, 6.90, 7.18, 8.10, and 14.5. These spectra are not specific for streptokinase, since similar patterns are obtained with other enzyme proteins.

The amino acid composition of the streptokinase is determined by the Stein and Moore ion exchange column technique and by microbiological assay. The data in Table 1 show the approximate composition.

Table 1

Amino Acid Composition of Streptokinase

| Amino Acid | Moles per Mole Protein* Chemical Analysis | Microbiological Assay |
| --- | --- | --- |
| Alanine | 19–21 | 18–20 |
| Arginine | 17–19 | 15 |
| Aspartic Acid | 53 | 54 |
| Cysteine | Trace | Less than 0.02 mol |
| Glutamic Acid | 37–38 | 41–42 |
| Glycine | 18–19 | 17 |
| Histidine | 8–10 | 7–8 |
| Isoleucine | 18–19 | 19 |
| Leucine | 32 | 34 |
| Lysine | 29–30 | 29–30 |
| Methionine | 3–4 | 4 |
| Phenylalanine | 12–13 | 16 |
| Proline | 14 | 13 |
| Serine | 20–21 | 20–21 |
| Threonine | 24–25 | 26 |
| Tryptophan | 1 | 1 |
| Tyrosine | 17–18 | 16–17 |
| Valine | 18–21 | 22–23 |
| Ammonia | 43–45 | — |

*Nearest whole number; calculated on the basis of MW = 47,000

By way of comparison, when "N-Z Amine" was employed as the nitrogen source in the fermentation medium instead of corn steep liquor, and said medium additionally contained the 12 conventional components used heretofore, the yield of streptokinase varied from zero to about 2,000 SK units per ml.

EXAMPLE 2

Still fermentation of hemolytic streptococci is carried out in 500 ml. Erlenmeyer flasks with a 10% inoculum mash (20 ml.) of growing hemolytic streptococci (strain H46A) in a total fermentation mash of 200 ml. The fermentation is carried out at 34° C, pH 7.0 ± 0.2, without agitation or aeration, for 12 to 20 hours. Fermentation runs were carried out under the foregoing conditions with various mash media comprising:

A. A two component medium containing 8% corn steep liquor, 7% Cerelose in water;
B. A four component medium containing 8% corn steep liquor, 7% Cerelose, 0.33% $KH_2PO_4$ and 0.2% $KHCO_3$ in water; and
C. A 16 component medium containing:

Table 2

| 16 Component Medium | |
| --- | --- |
| Component | % |
| Corn Steep Liquor | 8.0 |
| "Cerelose" | 7.0 |
| $KH_2PO_4$ | 0.33 |
| $KHCO_3$ | 0.2 |
| Cystine | 0.01 |
| Glycine | 0.01 |
| Tryptophane | 0.001 |
| Uracil | 0.001 |
| Adenine sulfate | 0.001 |
| Nicotinic acid | 0.0001 |
| Pyridoxine hydrocholoride | 0.00018 |
| Calcium pantothenate | 0.0005 |
| Thiamine hydrochloride | 0.00025 |
| Riboflavin | 0.00005 |
| Thioglycollic acid | 0.15 |
| Salt mix* | 0.2 |
| *grams/liter: $MgSO_4$ | 115 |
| $CuSO_4.5H_2O$ | 0.5 |
| $ZnSO_4.7H_2O$ | 0.5 |
| $MnCl_2.4H_2O$ | 0.2 |
| $FeSO_4.7H_2O$ | 0.5 |
| HCl (37%) | 10.0 |

Flask fermentations with mask media (A), (B), and (C), above, yielded excellent results, producing on the average from 1,200–1,800 streptokinase units per milliliter of culture media. The occasional poor lot of corn steep liquor was converted to a useful mash medium component by a clarification procedure comprising diluting the liquor to about 40% of its original concentration with water, adjusting to pH 8, heating to 121° C for 15 minutes, and then filtering. The clarified corn steep liquor was then used in the fermentation media to produce a similar yield of 1,200–1,800 SK units per ml. On the other hand, in eighteen different lots of N-Z-Amine, only ⅛ of the lots were able to produce useful yields of streptokinase (more than 800 SK units per ml) when used in the fermentation medium in place of corn steep liquor. Only one of the 18 lots produced as much as 1,200 SK units per ml. These poor N-Z-Amine lots cannot be made useful for increased yields of streptokinase by any known procedure. Thus, a consistency factor in streptokinase yield was obtained by employing corn steep liquor in fermentation media which could not be obtained with the N-Z-Amine used heretofore.

EXAMPLE 3

The fermentation procedure of Example 2 (B), above, was repeated three times with a poor lot of corn steep liquor which was unable to produce synthesis of more than 500 streptokinase units per milliliter of culture media in previous fermentations. Three aliquots were taken from this lot of corn steep liquor and clarified in the following manner prior to the fermentations:

| | |
| --- | --- |
| Aliquot 1 | filtered; |
| Aliquot 2 | heated to 100° C for 20 minutes followed by filtration; |
| Aliquot 3 | pH adjusted from its original level of 4.2 to 8.0 followed by filtration. |

In each case the fermentation with the clarified corn steep liquor in the fermentation medium produced synthesis of more than 1,400 streptokinase units per milliliter of culture medium after 15 hours of fermentation.

While dilution, increase in temperature, and increase in pH facilitate clarification of the corn steep liquor, they are unnecessary. Dilution to about 24% corn steep liquor and filtration in the presence of about 2% filter aid such as, for example, Celite 512 is preferred.

Various other examples of the present invention can be devised by those skilled in the art after reading the foregoing specification without departing from the spirit and scope of the invention. All such further examples are included within the scope of the invention as defined in the appended claims.

What is claimed is:
1. In the fermentative production of streptokinase by the growth of hemolytic streptococci, the improvement which comprises growing the bacteria in a fermentation medium comprising from about 3% to about 12% corn steep liquor and from about 3% to about 12% glucose.

2. The method of claim 1 in which the fermentation medium comprises about 8% corn steep liquor and 7% glucose.

3. The method of claim 2 in which the fermentation mash contains additionally from about 0.02% to about 2.0% $KHCO_3$ and from about 0.1% to about 2.0% $KH_2PO_4$.

4. The method of claim 3 in which the fermentation medium comprises about 8% corn steep liquor, 7% glucose, 0.33% $KH_2PO_4$ and 0.2% $KHCO_3$.

5. In the fermentative production of streptokinase by the growth of hemolytic streptococci, the improvement which comprises growing the bacteria in a fermentation medium comprising a metabolizable carbon source and from about 3% to about 12% corn steep liquor.

6. The method of claim 5 in which the fermentation is carried out at a temperature of from about 30° C to about 40° C, at a pH of from about 6 to about 8.5, and for about 8 to about 20 hours.

* * * * *